J. NUTTALL.
SKATE WHEEL.
APPLICATION FILED JUNE 3, 1909.

937,261.

Patented Oct. 19, 1909.

WITNESSES:

INVENTOR
John Nuttall
BY
Redding, Greeley & Austin
ATTORNEY

UNITED STATES PATENT OFFICE.

JOHN NUTTALL, OF CHICOPEE, MASSACHUSETTS, ASSIGNOR TO A. G. SPALDING & BROS., OF JERSEY CITY, NEW JERSEY, A CORPORATION OF NEW JERSEY.

SKATE-WHEEL.

937,261.    Specification of Letters Patent.    Patented Oct. 19, 1909.

Application filed June 3, 1909. Serial No. 500,003.

*To all whom it may concern:*

Be it known that I, JOHN NUTTALL, a citizen of the United States, residing in Chicopee, in the State of Massachusetts, have invented certain new and useful Improvements in Skate-Wheels, of which the following is a specification, reference being had to the accompanying drawing, forming a part hereof.

This invention relates to the manufacture of metal wheels which are specially adapted for use in roller skates and the object of the invention is to reduce the cost of manufacture and at the same time to produce a wheel which shall be very strong and shall have a non-slipping surface.

The invention will be more fully explained hereinafter with reference to the accompanying drawing in which it is illustrated, and in which—

Figure 1:
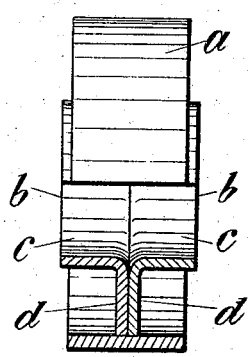
Figure 2:
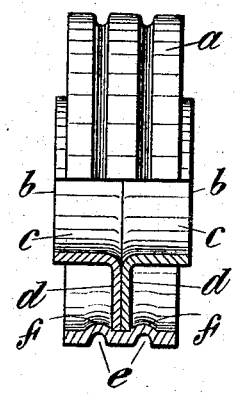
Figure 3:
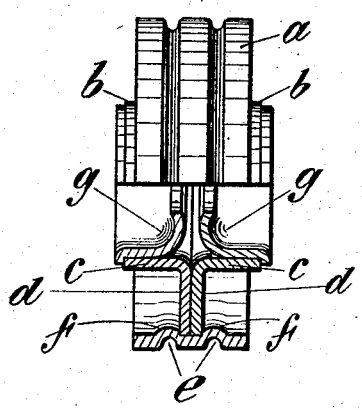

Figure 1 is a view, partly in elevation and partly in radial section, of a wheel in one of the preliminary stages of manufacture. Fig. 2 is a similar view of the wheel itself in the final stage of manufacture, and Fig. 3 is a view similar to Fig. 2 with the ball cups in place.

In the manufacture of the wheel there are first provided an external or rim member $a$ and two internal members $b$, each of which comprises a hub flange $c$ and a radial web $d$. The external or rim member $a$, in its first stage, is a plain, cylindrical shell. The two internal members $c$ are alike, but reversed, so that when placed together, as shown in Fig. 1, the radial webs $d$ shall be together. The rim member $a$ is of such internal diameter as to fit closely upon the radial webs $d$ of the internal members. When the external and internal members, as thus formed, have been assembled, with the radial webs of the internal members centrally disposed with respect to the external member $a$, the external member is subjected to compression in circumferential lines parallel with the plane of the radial webs but laterally offset with respect thereto. This compression, the structural results of which are shown in Figs. 2 and 3, accomplishes two purposes. First, it forms in the bearing surface of the external member two grooves $e$, which reduce very largely the liability of sidewise slipping of the wheel when in use; and, second, it forms interiorly two ridges $f$, which hold between them the radial webs $d$, uniting firmly the several parts of which the wheel is composed. As thus formed, the wheel is ready to have the bearings applied thereto, ball cups $g$ being shown in Fig. 3 as inserted in the ends of the hub.

I claim as my invention:

A skate wheel comprising two internal members, each having a hub flange and a radial web reversed, and a cylindrical rim member having in its outer surface circumferential grooves offset from the plane of the radial webs and on its internal surface circumferential ridges holding between them the radial webs of the internal members.

This specification signed and witnessed this first day of June A. D. 1909.

JOHN NUTTALL.

Signed in the presence of—
 F. C. BREAKSPEAR,
 H. L. HOLT.